United States Patent Office 3,539,513
Patented Nov. 10, 1970

3,539,513
LUBRICANT ADDITIVE
Eric Simon Forbes, Woking, Surrey, and John Michael Wood, Ashford, Middlesex, England, assignors to The Britannic Petroleum Company Limited, London, England, a corporation of England
No Drawing. Filed May 16, 1968, Ser. No. 729,538
Claims priority, application Great Britain, May 16, 1967, 22,686
Int. Cl. C10m 1/54, 1/36
U.S. Cl. 252—37.2                              4 Claims

ABSTRACT OF THE DISCLOSURE

Lubricating compositions containing, as a detergent/dispersant improver, an alkenyl N-polyamine succinimide have their detergent/dispersant properties improved by the addition of a basic zinc carboxylate salt thereto.

---

This invention relates to lubricating compositions, more particularly it relates to lubricating compositions containing additives to improve their detergent/dispersant properties.

Modern internal combustion engines operate at high speeds and at high compression ratios. When they are used in vehicles for driving in towns, so called "stop-and-go" driving conditions, the internal combustion engines do not reach their most efficient operating temperatures. Under these conditions partial oxidation products are formed which blow past the piston rings and reach the crank-case of the engine. Most of the patrial oxidation products are oil-insoluble and tend to form deposits on the various operating parts of the engine. In order to prevent the deposition of the partial oxidation products on the various parts of the engine it is necessary to incorporate detergent/dispersant additives in the oil to keep these partial oxidation products dispersed in the oil in a condition which is unfavourable to the deposition of these products of metals.

Various detergent/dispersant additives are added to crank-case oils to reduce this formation of partial oxidation sludge and to prevent the partial oxidation sludge from being deposited on the various operating parts of the engine such as the pistons, piston rings, etc. Among known detergent/dispersant additives are certain alkenyl polyamine succinimides.

It has now been found that the addition of certain basic zinc salts to oils containing an alkenyl N-polyamine succinimide has an unexpectedly beneficial effect on the detergent/dispersant properties of the oils.

According to the invention there is provided a lubricating composition based on a mineral or synthetic lubricating oil and containing dissolved therein (a) an alkenyl N-polyamine succinimide and (b) a basic zinc salt as hereinafter defined.

The basic zinc salts that can be used in this invention have the general formula: $(RCOO)_6Zn_4O$ where R is an alkyl, cycloalkyl, aryl, aralkyl or alkaryl group preferably having not more than 24 carbon atoms and more preferably an alkyl or cycloalkyl group having up to 18 carbon atoms. The preparation of these salts is described in French patent specification 1,483,233 and in U.S. Pat. No 3,367,869.

The structure of these basic zinc salts is such that there is an oxygen atom in the centre of a tetrahedral arrangement of the four zinc atoms and the six carboxylate groups are arranged along the sides of the tetrahedron.

Examples of the carboxylic acids from which the carboxylate groups of the basic zinc carboxylate are derived are 2-ethyl hexanoic and naphthenic acids; i.e. the salts are basic zinc 2-ethyl hexanoate and basic zinc naphthenate.

The alkenyl N-polyamine succinimides can be prepared by the reaction of a polyolefin and maleic anhydride at elevated temperature followed by the reaction of the alkenyl succinic anhydride thus formed with a polyamine at elevated temperature.

The alkenyl moiety can be dervide from polymers such as straight or branched chain olefin polymers e.g. polyethylene, polypropylene, polybutene, polyisobutylene, poly 4-mehtyl pentene-1, poly 3-methyl pentene-1, as well as copolymers such as ethylene/propylene copolymer and ethylene/isobutylene copolymer.

The polyamine moiety is preferably an alkylene polyamine such as ethylene diamine, diethylene triamine, triethylene tetramine, 1-methyl ethylene diamine, 1-ethyl ethylene diamine, propylene diamine and tetraethylene pentamine.

The basic zinc salt is preferably present in an amount of 0.1% to 20% by weight of the composition and more preferably is present in an amount of 0.1 to 5% by weight.

The alkenyl polyamine succinimide is preferably present in an amount of 0.1% to 10% by weight of the composition and more preferably is present in an amount of 0.1 to 5% by weight.

The basic zinc carboxylates are described in U.S. Pat. No. 3,367,869 as additives for reducing the acidity of lubricating compositions used in marine engines and it is unexpected that the addition to lubricating compositions of these basic zinc carboxlates, in conjunction with polyalkenyl polyamine succinimides, should give rise to a substantial enhancement of the dispersant/detergent activity of the oil. This effect is apparent at low concentrations of basic zinc carboxylate of the order of 1%, and even though the basic zinc carboxylates when used alone increase the detergent/dispersant properties of the oils, the effect of the addition of the basic zinc carboxylates in conjunction with the alkenyl polyamine succinimides gives rise to a synergistic effect and brings about a greater enhancement of the detergent/dispersant properties than would be expected.

The synergistic effect of a mixture of a basic zinc carboxylate and an alkenyl polyamine succinimide was determined by means of the procedure described in copending U.K. application 35,120/66; this procedure was the same as that described in U.S. Pat. No. 3,044,860 except that the oxidised gasoline fraction sludge precursor was neutralised with sodium bicarbonate before the precursor was added to the oil to be tested. Better reproducibility of test results is obtained when the precursor is neutral. In this test, a mixture of the test blend and an oxidised gasoline fraction is subjected to a mixed gas stream of oxygen, nitrogen and oxides of nitrogen at 100°C. for 6 hours. The oil is then drained and assessment made of its performance by rating the sludge deposits adhering to the reaction tube.

The results are shown in the following table. The base oil used was a high Viscosity Index, solvent refined, dewaxed mineral oil, of Viscosity Index 100 and a viscosity of 6.5 centistokes at 210° F.

| Additives: | Rating |
|---|---|
| None | 49.2 |
| 2% P.I.T.P.S. | 64.6 |
| 2½% basic zinc naphthenate | 59.4 |
| 2½% basic zinc 2-ethyl hexanoate | 54.2 |
| 1% P.I.T.P.S.+0.91% basic zinc 2-ethyl hexanoate | 80.1 |
| 1% P.I.T.P.S.+0.644% basic zinc napthenate | 85.1 |

In the table P.I.T.P.S. stands for polyisobutenyl tetraethylene pentamine succinimide.

As can be seen from the table the effect on the base oil of adding a basic zinc carboxylate and an alkenyl polyamine succinimide brings about a substantial and unexpected improvement of the detergent/dispersant properties of the oil.

We claim:
1. A lubricating composition which comprises a major amount of a lubricating base oil having dissolved therein
    (a) from 0.1 to 10% by weight based on the total weight of the composition of an alkenyl N-polyamine succinimide and
    (b) from 0.1 to 20% by weight based on the total weight of the composition of a basic zinc carboxylate of the general formula $(RCOO)_6Zn_4O$ where R is selected from alkyl, cycloalkyl, aryl, aralkyl or alkaryl groups having up to 18 carbon atoms, the basic zinc carboxylates having the structure such that there is an oxygen atom in the centre of a tetrahedral arrangement of the four zinc atoms, the six carboxylate groups being arranged along the sides of the tetrahedron.

2. A lubricating composition as claimed in claim 1 in which the said alkenyl N-polyamine succinimide is present in an amount of 0.1 to 5% by weight and the said basic zinc carboxylate is present in an amount of 0.1 to 5% by weight based on the total weight of the composition.

3. A lubricating composition as claimed in claim 1 in which the said basic zinc salt is selected from basic zinc 2-ethylhexanoate and basic zinc naphthenate .

4. A lubricating composition as claimed in claim 3 in which in the alkenyl N-polyamine succinimide the alkenyl moiety is derived from a polyolefin selected from polyethylene, polypropylene, polybutene, polyisobutylene, poly 4-methylpentene-1, poly 3-methylpentene-1 and copolymers thereof, and the polyamine moity is an alkylene polyamine.

References Cited
UNITED STATES PATENTS

| | | | |
|---|---|---|---|
| Re. 26,433 | 8/1968 | Le Suer | 252—35 X |
| 2,218,618 | 10/1940 | McNab et al. | 252—35 |
| 2,384,551 | 9/1945 | Jehle | 252—35 |
| 2,846,392 | 8/1958 | Morway et al. | 252—35 X |
| 3,367,869 | 2/1968 | Silver et al. | 252—35 |

DANIEL E. WYMAN, Primary Examiner

W. H. CANNON, Assistant Examiner

UNITED STATES PATENT OFFICE
CERTIFICATE OF CORRECTION

Patent No. 3,539,513   Dated November 10, 1970

Inventor(s) Eric Simon Forbes & John Michael Wood

It is certified that error appears in the above-identified patent and that said Letters Patent are hereby corrected as shown below:

Column 1, line 41, "of metals" should be - - on metals - -

Column 2, line 8, "dervide" should be - - derived - -

SIGNED AND SEALED
FEB 2 1971

(SEAL)
Attest:

Edward M. Fletcher, Jr.
Attesting Officer

WILLIAM E. SCHUYLER,
Commissioner of Pat

PO-1050
(5/69)

UNITED STATES PATENT OFFICE
CERTIFICATE OF CORRECTION

Patent No. 3,539,513　　　　　　　　　Dated　November 10, 1970

Inventor(s)　Eric Simon Forbes and John Michael Wood

It is certified that error appears in the above-identified patent and that said Letters Patent are hereby corrected as shown below:

Column 1, line 5, change "Britannic" to - - British - -

Signed and sealed this 24th day of August 1971.

(SEAL)
Attest:

EDWARD M. FLETCHER, JR.　　　　　　　　WILLIAM E. SCHUYLER, JR.
Attesting Officer　　　　　　　　　　　Commissioner of Patents